Aug. 7, 1934.    F. SHENTON ET AL    1,969,102
REFRIGERANT CONTROL FOR REFRIGERATING SYSTEMS
Filed Oct. 6, 1930
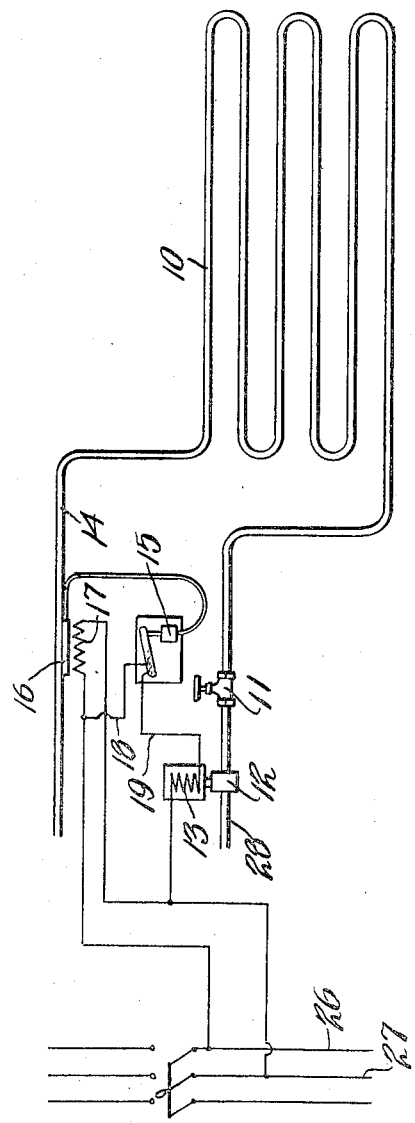
Inventors
Francis Shenton
Milton W. Garland
By
Attorney Patented Aug. 7, 1934

1,969,102

UNITED STATES PATENT OFFICE 1,969,102

REFRIGERANT CONTROL FOR REFRIGERATING SYSTEMS

Francis Shenton and Milton W. Garland, Waynesboro, Pa., assignors to Frick Company, Waynesboro, Pa., a corporation of Pennsylvania Application October 6, 1930, Serial No. 486,799

5 Claims. (Cl. 62—8)

This invention relates to refrigerating systems and particularly to means for controlling the flow of refrigerant to the evaporator.

An object of the invention is to provide means for controlling admission of the refrigerant to an evaporator in response to the temperature of and to a change of degree of saturation of the refrigerant leaving the evaporator.

Referring to the accompanying drawing which is made a part hereof and on which similar reference characters indicate similar parts, The single figure is a diagrammatic view of an evaporator of a refrigerating system showing our invention applied thereto.

In the drawing numeral 10 indicates an evaporator of a refrigerating system into which the refrigerant passes through a manually controlled valve 11 in line 28. In advance of or behind the valve 11 is placed a valve 12 which is operated by a solenoid 13. When the solenoid 13 is energized the valve 12 is opened and when the solenoid 13 is de-energized the valve 12 is closed.

We provide means controlled by the change of temperature of the refrigerant or the change of degree of saturation of the refrigerant in the suction line 14 for controlling the valve 12. This means consists of a thermostat 15 which has its thermal element 16 placed in contact with the suction line 14 or on the inside of the suction line 14 so as to be affected by the change of temperature of the refrigerant or a change of degree of saturation of the refrigerant in this suction line. We provide a heating device 17 placed close to the thermal element 16 for the purpose of affecting temperature change. When the temperature of the refrigerant in the suction line 14 plus the temperature due to the constant quantity of heat applied by the heating unit 17 rises above a predetermined degree, the thermal element 16 operates the thermostat 15 so that contact is made in electrical circuit 18, 19. Electrical circuit 18, 19 is completed through the solenoid 13 and the power lines 26 and 27 thus energizing the solenoid coil 13 and opening the refrigerant supply valve 12. When the temperature of the refrigerant in the suction line 14 plus the constant quantity of heat from the heating element 17 drops below a predetermined value the thermal element 16 is affected and operates the thermostat 15 opening the electrical circuit 18, 19 thus de-energizing the solenoid coil 13 and permitting the refrigerant feed valve 12 to close.

When the degree of saturation of the refrigerant in the suction line 14 is reduced to such an amount that the refrigerating effect of this saturation is no longer able to overcome the heat dissipated by the heater 17, then the temperature in the thermal element 16 rises to the predetermined amount and operates the thermostat 15 which closes the electrical circuit 18, 19 thus energizing the solenoid coil 13 and opening the refrigerant supply valve 12. When the degree of saturation of the refrigerant in the suction line 14 becomes sufficient to cause reduction of temperature in the thermal element 16 by overcoming the heat dissipated by the heating unit 17, then at a predetermined temperature the thermal element 16 operates the thermostat 15, opening the electrical circuit 18, 19 thus de-energizing the solenoid 13 and closing the refrigerating feed valve 12.

The solenoid 13 and valve 12 may be constructed to operate the reverse from the above specification, that is, to close when the solenoid is energized and open when the solenoid is de-energized. The operation of the thermostat and thermal element is then correspondingly reversed to close the electrical circuit with a drop in temperature and open the electric circuit with a rise in temperature.

It will be obvious to those skilled in the art that various changes may be made in our device without departing from the spirit of the invention and therefore we do not limit ourselves to what is shown in the drawing and described in the specification but only as indicated in the appended claims.

Having thus fully described our said invention, what we claim as new and desire to secure by Letters Patent, is:

1. In an evaporator, means for maintaining a predetermined temperature therein which comprises a manually operated valve for controlling the rate of flow of refrigerant to the said evaporator, a second valve, a power device for opening and closing the said second valve, a thermal element positioned adjacent the suction line from said evaporator, this thermal element affecting a thermostat in control of the said power device whereby a change of temperature of the refrigerant in the suction line from the evaporator will operate the power device to open or close the valve to control admission of refrigerant to said evaporator, substantially as set forth.

2. In an evaporator having a feed line thereto and a suction line therefrom, a control device for maintaining a predetermined temperature in the evaporator comprising a valve positioned in the feed line, a thermostat having a heating unit in conjunction therewith and affecting its operation, said thermostat being positioned in heat exchange relation with the suction line from the evaporator, the said thermostat being in control of the said valve, substantially as set forth.

3. In an evaporator having a feed line thereto and a suction line therefrom, a control device for maintaining a predetermined temperature in the evaporator comprising a power controlled valve positioned in the feed line and a thermostat positioned adjacent the suction line from the evaporator, the said thermostat being in control of the said valve, a heating element for said thermostat, operation of the said thermostat being affected by the heating element as well as by the refrigerant being controlled, substantially as set forth.

4. In an evaporator having a feed line thereto and a suction line therefrom, a control device for maintaining a predetermined temperature in the evaporator comprising a valve positioned in the said feed line, a power device for operating said valve, a thermostat having a heating unit associated therewith and positioned in heat exchange relation with the said suction line, said thermostat being in control of the said power device to control admission of refrigerant to the said evaporator, substantially as set forth.

5. In an evaporator having a refrigerant supply line thereto and a suction line therefrom, means for maintaining a predetermined temperature therein comprising a manually operable valve for controlling the flow of refrigerant to the evaporator, a second valve, a power device for opening and closing the said second valve, a switch in control of said power device, a thermostat having a heating unit associated therewith and positioned in heat exchange relation with the suction line from the evaporator, the said thermostat operating said switch to control said power device whereby a change of temperature of the refrigerant in the suction line from the evaporator or a change of degree of saturation of the refrigerant leaving the evaporator will operate the power device to open or close the valve to control admission of refrigerant to said evaporator, substantially as set forth.

FRANCIS SHENTON.
MILTON W. GARLAND.